(12) United States Patent
Kretschmann et al.

(10) Patent No.: US 6,620,644 B2
(45) Date of Patent: Sep. 16, 2003

(54) METHOD FOR MANUFACTURING A THIN-LAYER COMPONENT, IN PARTICULAR A THIN-LAYER HIGH-PRESSURE SENSOR

(75) Inventors: André Kretschmann, Reutlingen (DE); Ralf Henn, Stuttgart (DE); Volker Wingsch, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 203 days.

(21) Appl. No.: 09/816,997

(22) Filed: Mar. 23, 2001

(65) Prior Publication Data

US 2001/0024865 A1 Sep. 27, 2001

(30) Foreign Application Priority Data

Mar. 25, 2000 (DE) ......................... 100 14 984

(51) Int. Cl.[7] .............................. H01L 21/00
(52) U.S. Cl. ..................... 438/50; 438/51; 438/52; 438/53; 438/54; 438/55
(58) Field of Search ............... 438/50, 51, 52, 438/53, 54, 55

(56) References Cited

U.S. PATENT DOCUMENTS 6,313,905 B1 * 11/2001 Brugger et al. ............... 355/55
6,319,743 B1 * 11/2001 Marchant et al. ............. 438/50

* cited by examiner

*Primary Examiner*—Kevin M. Picardat
(74) *Attorney, Agent, or Firm*—Kenyon & Kenyon

(57) ABSTRACT

A manufacturing method for a thin-layer component, in particular a thin-layer high-pressure sensor, having a substrate on which the at least one functional layer to be patterned is to be deposited in the steps, preparing the substrate; depositing the functional layer on the substrate; and patterning the functional layer via a laser processing step, the laser processing step being selective with respect to the substrate.

7 Claims, 2 Drawing Sheets

METHOD FOR MANUFACTURING A THIN-LAYER COMPONENT, IN PARTICULAR A THIN-LAYER HIGH-PRESSURE SENSOR

FIELD OF THE INVENTION

The present invention relates to a method for manufacturing a thin-layer component, in particular a thin-layer high-pressure sensor having a substrate on which at least one functional layer to be patterned is to be deposited. The present invention as well as the underlying objective are explained with reference to a thin-layer high-pressure sensor, although they could, in principle, be applied to any thin-layer component.

BACKGROUND INFORMATION

High-pressure sensors are used in several systems in the motor vehicle industry. Among them are direct fuel injection systems, common rail direct diesel fuel injection systems, electronic stability programs, and electrohydraulic brake systems. High-pressure sensors are also used in the field of automation technology. The function of these sensors is based on using a thin-layer system to convert the mechanical deformation of a stainless steel membrane produced by pressure into an electrical signal. In this context, the deformation and, thus, the output signal are determined by the mechanical characteristics of the membrane and the pressure to be measured.

FIG. 2 shows the design of the thin-layer system of high-pressure sensors typically used today.

An insulating layer 20, usually $SiO_x$, is disposed directly on a steel membrane 10, which is an integrated component of a holding device 100. Four strain gauges 30 (three are shown in FIG. 2) made of NiCr, NiCrSi, or doped poly-Si, for example, are disposed on insulating layer 20. The strain gauges form a Wheatstone's bridge, which is extremely sensitive with respect to the slightest change in the resistance of the individual strain gauges 30. Strain gauges 30 are contacted via a special contact layer or a corresponding layer system 40 having, for example, the layer sequence, NiCr layer 43/Pd layer 42/Au layer 41 (or Ni). A passivation layer 50, usually an $Si_xN_y$ layer, protects subjacent layer system 40 from external influences.

Due to the measuring bridge's high degree of sensitivity, it is important that passivation layer 50 completely cover the actual measuring bridge in order to ensure an interference-free operation of the sensor element under the operating conditions of motor vehicles (the sensor element's contacting surfaces are generally unpassivated).

In representing the thin-layer system, as described above, the thin-layer process typically represents a processing of the individual sensor elements in a larger group, which greatly reduces processing costs. Such a grouping is achieved with the help of a workpiece support in which the individual steel substrates to be coated are placed.

Generally, insulating layer 20 is deposited over the entire surface on the surface to be coated of steel membrane 10. Subsequently, the actual functional layer for strain gauges 30 is deposited over the entire surface. Strain gauges 30 are then produced with the help of a photolithographic patterning step. Subsequently, the contact layer or contact layer system 40, usually also being photolithographically patterned, is deposited. Shadow masking is also used as an alternative to photolithographically patterning contact layer 40. This is often followed by a balancing operation to adjust the desired electrical characteristics (in particular to adjust the symmetry of the bridge). Subsequently, passivation layer 40 is deposited which is also patterned photolithographically or using a shadow mask.

It can be concluded that the currently used manufacturing process necessitates at least one photolithographic patterning step for producing the thin-layer system described above.

For processing a plurality of sensor elements in a workpiece support, such a photolithographic patterning step, which generally includes the individual processes of preconditioning, resist coating, pre-baking, exposing, developing, (hard bake) etching, and removing the resist coating, entails numerous difficulties. Maintaining the required geometric tolerances and achieving a sufficient resist coating result represent particular difficulties. Maintaining the geometric tolerances necessitates a very precisely machined and, thus, expensive workpiece support. Moreover, the exposure plane, which is insufficiently defined due to the process tolerances of the individual elements, leads to significant deviations in the attained line widths. Furthermore, in mass production, a significant expenditure is required to prevent the materials from being carried over from one process step to the next.

As a result of all of the stated difficulties, a lithographic patterning step entails significant yield losses.

SUMMARY OF THE INVENTION

With respect to known approaches, the manufacturing method according to the present invention has the advantage that the layer construction of the high-pressure sensors used today can be achieved without a single photolithographic patterning step. Thus, the difficulties connected with the photolithographic patterning step are eliminated. Contrary to other proposed thin-layer processes not involving a photolithographic patterning step, the typical layer sequence of the high-pressure sensors currently in use can be maintained. This layer sequence has proven to be particularly successful under the operating conditions in motor vehicles. Thus, complete functionality, including stability throughout the working life, resistance to media, and electromagnetic compatibility, can be ensured despite the alteration in process.

An idea underlying the present invention is that of a thin-layer process for processing high-pressure sensor elements not requiring a photolithographic patterning step for patterning a functional layer. Thus, the functional layer's pattern, for example strain gauges, is produced using an appropriate laser patterning step.

Substituting the photolithographic patterning step, which is comprised of the above-mentioned individual processes, with a single laser patterning step results in significantly simpler process management. This leads to significantly shorter process times and greatly reduced handling expenditures, which is beneficial for mass production. Instead of a resist coating device, an oven, an exposer, a developer, an etching device, and a resist coating removal device, only an appropriately equipped laser is necessary, which signifies, among other things, a smaller need for clean room area and leads to reduced costs. The increased yield as a result of eliminating the yield-critical process steps, preconditioning, resist coating, exposing, developing, and removing the resist coating, also contributes to savings. Due to the smaller demands on the workpiece support, reduced costs can also be expected in this context. As a result of smaller cumulative tolerances, the strain gauges can be more exactly positioned on the sensor element.

Due to the more favorable etching behavior, the NiCrSi, for example, is typically deposited at room temperature in the usual method. After etching using a wet chemical treatment, a thermal treatment is necessary to cause the recrystalization to occur in the desired stage. In the case of laser patterning according to the present invention, the NiCrSi can be directly deposited in the desired stage. The thermal treatment is then unnecessary, i.e., an additional process step involving significant logistical difficulties is no longer needed. Contrary to an etching process using a wet chemical treatment, there is no danger of the substrate, e.g., the steel substrate, being corroded when creating the functional layer's pattern, for example, the strain gauges, via laser patterning. Selecting the material for the workpiece support is also simplified as a result of the reduced demands with respect to the resistance to media.

According to a preferred further refinement, an excimer laser having an appropriate optical system is used in conjunction with a mask for laser processing to transfer the desired pattern of the functional layer from the mask to the thin-layer component in one exposure step.

According to an additional preferred further refinement, the thin-layer component has a contact layer or a contact-layer system for contacting the patterned functional layer, and using a shadow mask, the contact layer or the contact-layer system is directly deposited with the desired geometric pattern.

According to another preferred further refinement, the thin-layer component has a passivation layer for passivating the patterned and contacted functional layer, and using a shadow mask, the passivation layer is directly deposited with the desired geometric pattern.

When the contact layer and the passivation layer are deposited with the help of shadow masks, absolutely no photolithographic patterning step is required for processing the thin-layer high-pressure sensor elements.

According to an additional preferred embodiment, the thin-layer component is a thin-layer high-pressure sensor where the substrate has a steel membrane and an overlying insulating layer.

According to another preferred further refinement, the functional layer is an NiCrSi layer or a poly-Si layer from which the strain gauges are patterned for a resistance measuring bridge.

According to a further preferred exemplary embodiment, the resistance measuring bridge is adjusted by a laser processing step analogous to the patterning. Thus, two similar process steps can be carried out by one and the same apparatus.

DETAILED DESCRIPTION

Figure 1:
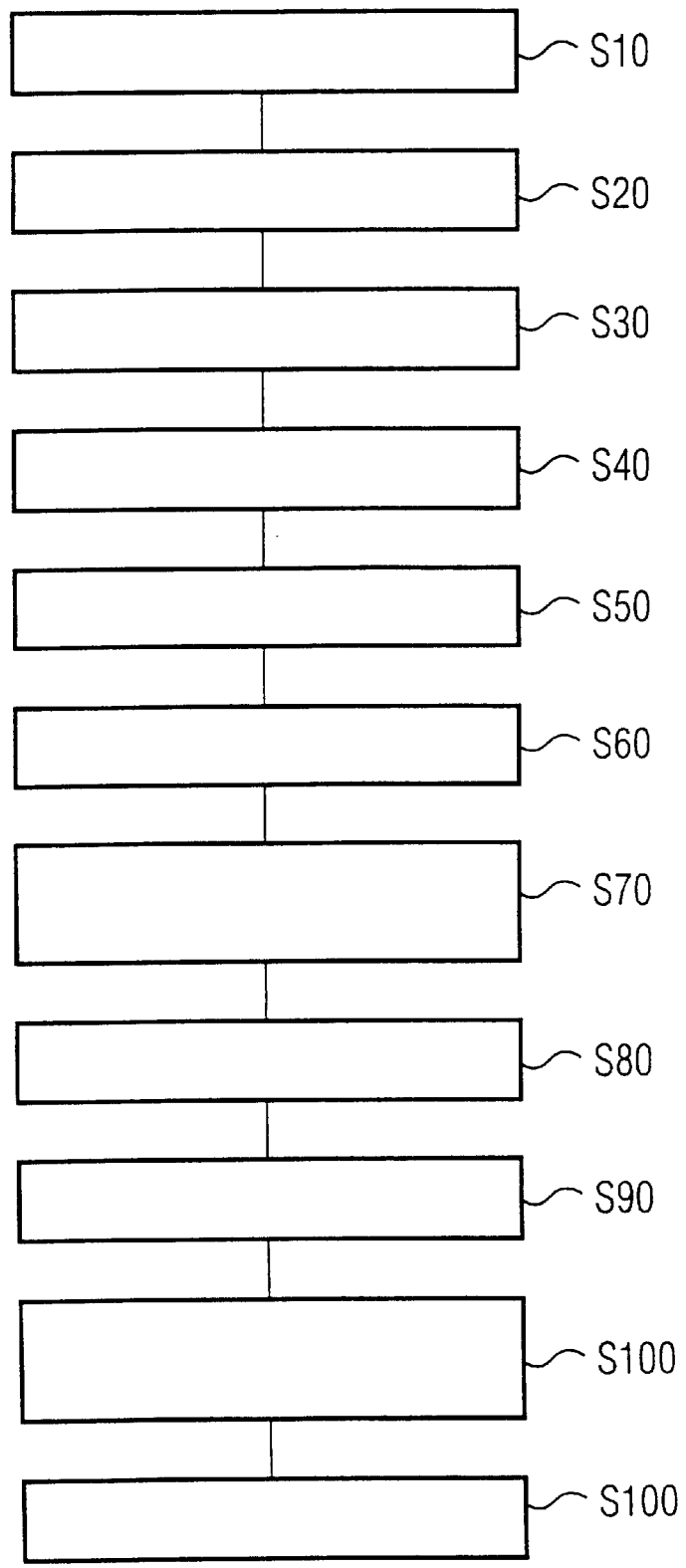
FIG. 1 shows a flow chart for illustrating the specific process steps for an exemplary embodiment of the manufacturing method according to the present invention.
Figure 2:
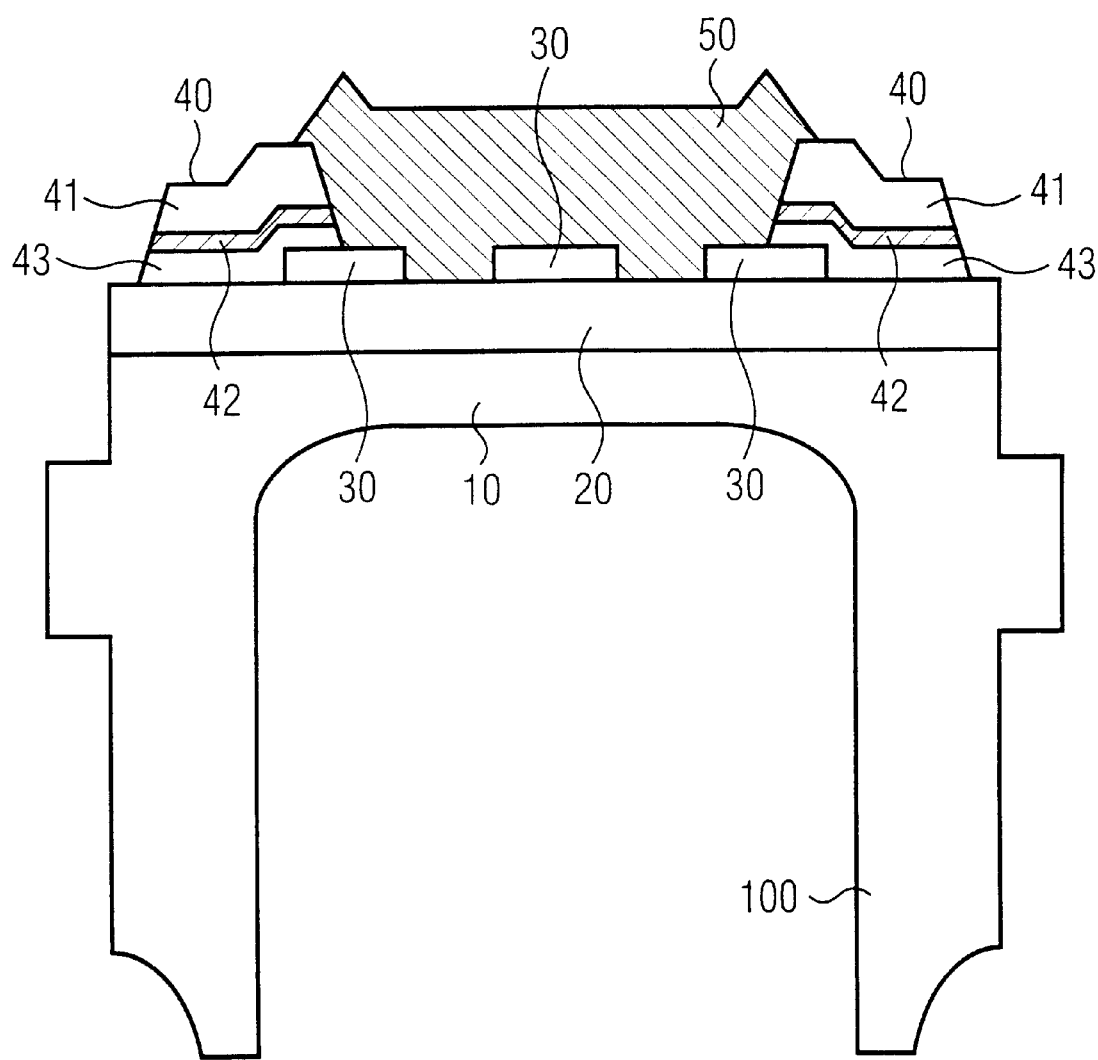
FIG. 2 shows the design of the thin-layer system of the high-pressure sensors typically used today.

FIG. 1 shows a flow chart for illustrating the specific process steps for an exemplary embodiment of the manufacturing method according to the present invention. The sequence of the thin-layer process according to the present invention is explained in the following with reference to FIGS. 1 and 2.

First, in the present example, steel membrane 10 is subjected to an initial cleaning step S10, which will not be more closely explained here. The first layer, which is deposited in step S20, is $SiO_x$-insulating layer 20. The first layer is typically deposited over the entire surface using a CVD process (chemical vapor deposition). It is not necessary to pattern $SiO_x$-insulating layer 20.

This is followed by an intermediate cleaning step S30, which is also not more closely described.

The second layer, which is deposited in step S40, is the actual functional layer from which strain gauges 30 are created. In the case of the poly-Si, a CVD process is typically used. As a rule, the NiCrSi is deposited by sputtering. Thus, in step S40, the functional layer is deposited over the entire surface of $SiO_x$-insulating layer 20.

NiCrSi strain gauges or poly-Si strain gauges 30 are produced by laser patterning in step S50. For this purpose, an excimer laser having an appropriate optical system is preferably used in conjunction with a mask, which enables the pattern of strain gauges 30 to be transferred from the mask to the respective sensor element in one exposure step. In this context, the power density and wavelength of the excimer laser are to be adjusted in such a way that the poly-Si or NiCrSi are selectively removed from the underlying $SiO_x$ of $SiO_x$-insulating layer 20 in the "exposed" regions.

In connection with the laser patterning, it is useful to deposit the poly-Si layer or the NiCrSi layer using a shadow mask that covers the edge area of the sensors. As a result, residues of the functional layer can be prevented from remaining in the edge area and causing electrical flashovers during operation. Simultaneously, as a result, the surface to be processed by the laser can be reduced, thereby causing a reduction in the required laser power.

This is followed by an intermediate cleaning step S60, which is also not more closely described.

Using a shadow mask, NiCr/Pd/Au contact layer system 40, i.e., the layer sequence, NiCr layer 43/Pd layer 42/Au layer 41 (or Ni), is directly deposited with the correct geometric dimensions in step S70 by sputtering or electron-beam vaporization. For this purpose, the shadow mask must be mounted once, and then all three layers can be deposited consecutively. In this context, NiCr layer 43 is used as an adhesive agent, Pd layer 44 is used as a diffusion barrier, and Au layer 41 represents the actual bonding surface.

It is typical for material to flow underneath shadow masks. This instance of material flowing underneath the mask is strongly dependent on the exact geometric conditions. If the geometric conditions are precisely defined, this occurrence can be prevented when preparing the masks. Alternatively, as a result of shadow masking, other contact materials, such as Ni or Al, can also be deposited. Using shadow masking avoids a selective removal of contact materials from the material of the strain gauges.

The unpassivated bridge can subsequently be adjusted in step S80 by, for example, targeted laser cutting, again using an excimer laser, in regions of the NiCrSi pattern or poly-Si pattern of strain gauges 30 intended for that purpose.

This is followed by an intermediate cleaning step S90, which is also not more closely described.

$Si_xN_y$-passivation layer 50 is deposited in step S100 by a PECVD (plasma enhanced chemical vapor deposition) process or by sputtering using a shadow mask. Thus, $Si_xN_y$-passivation layer 50 is also directly deposited with the correct geometric dimensions. The same is true for the shadow masks as for the NiCr/Pd/Au deposition in step S70.

Alternatively, $Si_xN_y$-passivation layer 50 can also be deposited over the entire surface and subsequently laser-patterned. As a result, the expensive manufacture of the workpiece support for depositing the passivation using a shadow mask can be avoided, thereby making it possible to save on additional costs resulting from the manufacture of highly precise workpiece-support components and their maintenance as well as from yield losses during assembly. Furthermore, the process tolerances of the relative position of the layers lying on top of one another can be significantly improved.

$Si_xN_y$-passivation layer 50 being deposited last ensures that the sensitive region of the thin-layer system, i.e., the actual measuring bridge, is protected by $Si_xN_y$-passivation layer 50.

The aging process in step S110 is used to stabilize the thin-layer system.

Although the method of manufacture according to the present invention is described based on the aforementioned preferred exemplary embodiments, the method is not limited thereto, but can be modified in a plurality of ways.

In particular, the selection of the layer materials and the thickness of the deposited layers can be selected according to the specific application.

What is claimed is:

1. A method for manufacturing a thin-layer component, comprising the steps of:

preparing a substrate;

depositing a functional layer on the substrate; and patterning the functional layer via a laser processing technique, the laser processing technique being selective with respect to the substrate, the laser processing technique removing a portion of the functional layer.

2. The method according to claim 1, further comprising the step of using an excimer laser having a corresponding optical system in conjunction with a mask for laser processing to transfer a desired pattern of the functional layer from the mask to the component in one exposure step.

3. The method according to claim 1, further comprising the step of directly depositing one of a contact layer and a contact layer system of the component with a preselected geometric pattern using a shadow mask, the one of the contact layer and the contact layer system being for contacting the patterned functional layer.

4. The method according to claim 3, further comprising the step of directly depositing a passivation layer of the component with a preselected geometric pattern using a shadow mask, the passivation layer being for passivating the patterned and contacted functional layer.

5. The method according to claim 1, wherein the component is a thin-layer high-pressure sensor, and the substrate has a steel membrane and an insulating layer situated above the membrane.

6. The method according to claim 1, further comprising the step of patterning strain gauges from the functional layer to form a resistance measuring bridge, the functional layer being one of a NiCrSi layer and a poly-Si layer.

7. The method according to claim 6, further comprising the step of adjusting the resistance measuring bridge by a laser processing technique analogous to the patterning.

* * * * *